United States Patent
Kahng et al.

(10) Patent No.: US 9,148,373 B2
(45) Date of Patent: Sep. 29, 2015

(54) NETWORK SYSTEM

(71) Applicant: Intellectual Discovery Co., Ltd., Seoul (KR)

(72) Inventors: Hyun Kook Kahng, Seoul (KR); Su-Jin Lee, Daejeon (KR); Dae In Choi, Suwon-Si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/754,432

(22) Filed: Jan. 30, 2013

(65) Prior Publication Data

US 2013/0223447 A1     Aug. 29, 2013

Related U.S. Application Data

(63) Continuation of application No. PCT/KR2011/005660, filed on Aug. 1, 2011.

(60) Provisional application No. 61/437,748, filed on Jan. 31, 2011.

(30) Foreign Application Priority Data

Jul. 30, 2010     (KR) .................. 10-2010-0073757

(51) Int. Cl.
*H04L 12/28*     (2006.01)
*H04L 12/56*     (2006.01)
(Continued)

(52) U.S. Cl.
CPC .......... *H04L 45/741* (2013.01); *H04L 61/2092* (2013.01); *H04L 61/609* (2013.01); *H04L 12/5865* (2013.01); *H04L 61/2514* (2013.01); *H04L 61/6095* (2013.01)

(58) Field of Classification Search
CPC ............ H04L 61/2092; H04L 12/5865; H04L 61/2514; H04L 61/6095; H04L 61/609; H04L 45/741

See application file for complete search history.

(56) References Cited

U.S. PATENT DOCUMENTS 6,829,230 B1 *    12/2004    Tiuri .............................. 370/351
7,525,933 B1 *    4/2009     Hall .............................. 370/310
(Continued)

FOREIGN PATENT DOCUMENTS

CN          101606406 A        12/2009
KR         2009-0032193 A       4/2009
(Continued)

OTHER PUBLICATIONS

Khaled, Yacine, et al. "Application of IPv6 multicast to VANET", Proceedings from the 9th International Conference on Intelligent Transport Systems Telecommunications (ITST), conference held on Oct. 20-22, 2009, Lille, France, (5 pages, in English).

(Continued)

*Primary Examiner* — Ajay Cattungal
(74) *Attorney, Agent, or Firm* — NSIP Law

(57) ABSTRACT

A method for packet processing in a network including a plurality of terminals, includes generating, by a first terminal, a packet including a geographical address. The first terminal transmits the packet transmitted to a destination. The geographical address includes a location information field having location information of the first terminal and a range field indicating whether the destination is a single destination representing that the destination is a target terminal or an area destination representing the destination is a target area. The range field has range information of the target area in the case that the destination is the area destination.

13 Claims, 12 Drawing Sheets

(51) Int. Cl.
   *H04L 29/12* (2006.01)
   *H04L 12/58* (2006.01)

(56) References Cited

U.S. PATENT DOCUMENTS

| | | | |
|---|---|---|---|
| 2002/0016858 A1* | 2/2002 | Sawada et al. | 709/238 |
| 2003/0162548 A1* | 8/2003 | Kujala | 455/456 |
| 2006/0198372 A1* | 9/2006 | Lee | 370/389 |
| 2006/0234727 A1* | 10/2006 | Ashley et al. | 455/456.4 |
| 2007/0098010 A1* | 5/2007 | Dube et al. | 370/463 |
| 2007/0123273 A1* | 5/2007 | Vare et al. | 455/456.1 |
| 2007/0155400 A1* | 7/2007 | Madsen | 455/456.1 |
| 2007/0191022 A1* | 8/2007 | Yanagihara | 455/456.1 |
| 2007/0198702 A1 | 8/2007 | Bishop | |
| 2008/0008179 A1* | 1/2008 | Chen et al. | 370/392 |
| 2010/0279776 A1* | 11/2010 | Hall | 463/42 |
| 2011/0102459 A1* | 5/2011 | Hall | 345/633 |
| 2011/0103302 A1* | 5/2011 | Hall | 370/328 |
| 2011/0244798 A1* | 10/2011 | Daigle et al. | 455/41.2 |
| 2013/0157692 A1* | 6/2013 | Hall et al. | 455/456.3 |
| 2013/0244564 A1* | 9/2013 | Hall | 455/3.01 |

FOREIGN PATENT DOCUMENTS

| | | |
|---|---|---|
| KR | 2009-0129573 A | 12/2009 |
| WO | WO 01/22656 A2 | 3/2001 |

OTHER PUBLICATIONS

Ding, Rong, et al. "Location-based IP addressing in IP-enable wireless sensor networks", Proceedings from the International Conference of Control, Automation and Systems Engineering (CASE), conference held on Jul. 30-31, 2011, Singapore (4 pages, in English).

Extended European Search Report mailed Oct. 8, 2014 in counterpart European Application No. 11812816.4 (7 Pages, in English).

International Search Report of PCT/KR2011/005660 dated Feb. 16, 2012.

Julio C. Navas et al., "GeoCast-Geographic Addressing and Routing", Mobile Computing and Networking: MOBICOM' 97, 1997.

Brad Karp et al., "GPSR: Greedy Perimeter Stateless Routing for Wireless Networks", Mobile Computing and Networking: MOBICOM' 2000, 2000.

* cited by examiner

NETWORK SYSTEM

This application is a continuation of international application PCT/KR2011/005660 filed Aug. 1, 2011, which claims priority on U.S. 61/437,748 filed Jan. 31, 2011 and Korean Patent Application No. 10-2010-0073757 filed Jul. 30, 2010, the entire contents of each of which is hereby incorporated by reference.

TECHNICAL FIELD

The present inventive concept relates to a network system with a new structure to be applied to future networks.

BACKGROUND

Around February 2011, the IANA (Internet Assigned Numbers Authority) stopped assigning IPv4 addresses, which are almost exhausted. However, as ubiquitous networks are getting increasingly popular, demands for IP addresses are being sharply increased. Thus, countries including Korea are promoting transitioning to IPv6 networks.

Also, developments in technology and international standardization have been actively made for the ubiquitous networks including future networks (FN), sensor networks (SN), and body area networks (BAN), which are considered as high-tech industry fields.

Computing devices have been advanced to be capable of recognizing their surroundings. Especially, mobile computing devices have become multifunctional devices having various sensors, a GPS (Global Positioning System) receiver, and wired/wireless network card equipment.

Such devices make it possible to acquire location of a person or an object, and location-based services are getting more attention as they can create various added values using the location information.

The goal is integrating heterogeneous networks to establish a ubiquitous network environment that can provide more extensive services, and providing interworking between various wireless networking technologies to provide all IP-based services. Thus, studies on technologies for heterogeneous network interworking and expanding service ranges have been actively made.

Design objectives of future networks include providing network scalability. Wireless multi-hop networks having Internet connectivity for expanded networking coverage are being developed.

The larger the wireless multi-hop network is, the better the performance of routing methods using location information is, compared with the conventional topology-based ad hoc routing protocols.

However, routing methods using location information need additional processes, such as using location information providing services, for acquiring and maintaining location information and have additional overheads because transmitted packets should always include location information therein.

In order to solve those problems with the location-based routing methods, a new address system with physical location information included in the node address is desired. Furthermore, location-based routing methods using the new location-based address system can be expected to be adopted as a new routing approach in other various network environments as well as the wireless multi-hop networks due to some advantages including network scalability, such as reduced loads in router and optimized routing paths.

Furthermore, the location-based address system makes it possible to provide services without any additional process for acquiring location information. By way of example, the conventional IP address system incurs additional overheads to include location information in order to represent an area for sensing data, or provide a location-based service using geocasting that transmits a packet to a group of nodes in a specific area.

If it is possible to express a data sensing area or a geocasting area in an address system including physical location information, the location-based services can be provided with simpler procedures thanks to the uniform expression of location information.

However, the conventional IPv6 address system does not take into account a geographical concept, and has problems like the need of additional processes and unnecessary overheads for acquiring location information.

Therefore, there is a need for a geographical address system compatible with the IPv6 address system, and routing methods using the geographical address system, which will allow a wide variety of location-based services that require location information of things to be applied to ubiquitous networks so that various application services can be provided.

In this regard, Korean Patent Laid-open Publication No. 2009-0129573 (entitled "Method and Apparatus for Multi-hop Routing Considering Link Lifetime By Node Movement") describes that overall routing performance is enhanced by minimizing link disconnection in a mobile ad hoc network.

And U.S. Patent Laid-open Publication No. 2007/0198702 (entitled "Traffic Routing Based on Geophysical Location") describes that a network traffic routing event occurs on multiple network devices dispersed over a specific geographical area, that a geographical perimeter for the network traffic routing event is determined, that a subset of network devices within the geographical perimeter is identified, and that a communication is sent to the network devices based on the network traffic routing event.

SUMMARY

Some illustrative embodiments of the present inventive concept provide a network address generating apparatus capable of reducing additional procedures for providing location services and increasing routing efficiency by means of generating an address with consideration of geographical concept based on location information of a terminal and using location-based routing methods in which a router transmitting a packet uses the location information included in the destination address of the packet.

Means for Solving the Problems

One aspect of the present inventive concept provides a method for packet processing in a network including a plurality of terminals. The method includes generating, by a first terminal, a packet including a geographical address and transmitting, by the first terminal, the packet to a destination. The geographical address includes a location information field having location information of the first terminal and a range field indicating whether the destination is a single destination representing that the destination is a target terminal or an area destination representing the destination is a target area. The range field has range information of the target area in the case that the destination is the area destination.

Another aspect of the present inventive concept provides an apparatus for generating a network address of a node. The apparatus includes an absolute locator generating unit that generates an absolute locator including at least one of latitude, longitude, altitude, and an area range from an absolute location of the location of the node. The apparatus also includes a relative locator generating unit that generates a relative locator including at least one of a distance of the node from a reference point and an area range of the node from the reference point. The apparatus generates the node's network address including either the absolute locator or the relative locator.

Yet another aspect of the present inventive concept provides a method for managing a locator, including transmitting by a node to a local global router that serves the node a request message requesting for registering the node's flexible local address. The method also includes receiving by the node from the local global router a reply message for the request message. The locator includes either an absolute locator including at least one of latitude, longitude, altitude, and an area range from an absolute location of the location of the node, or a relative locator including at least one of a distance of the node from a reference point and an area range of the node from the reference point. The request message includes a locator and an identifier of the node.

A network address generating apparatus in accordance with an illustrative embodiment of the present inventive concept can reduce additional procedures for providing location services and improve routing efficiency. This can be done by generating an address with consideration of geographical concept based on location information of a terminal, and using location-based routing methods in which a router transmitting a packet uses the location information included in the destination address of the packet A terminal in accordance with an illustrative embodiment of the present inventive concept can automatically set its address without help of an external communication device. Also, the adoption of the geographical address system, in employing an efficient location-based routing method for wide area service coverage networks, provides improved network performance by reducing procedures and overheads required for acquiring and forwarding location information.

Figure 1:
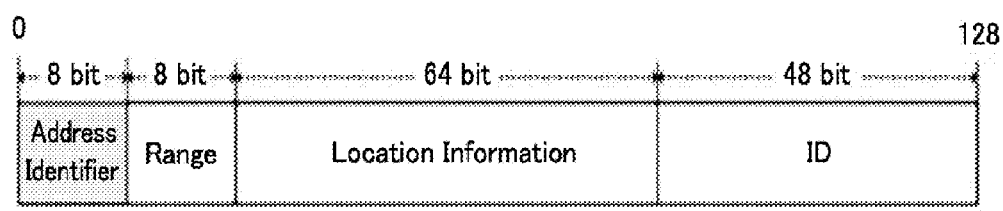
FIG. 1 is a basic explanatory diagram of a geographical address system in accordance with an illustrative embodiment of the present inventive concept.

Hereinafter, embodiments of the present inventive concept will be described in detail with reference to the accompanying drawings so that the present inventive concept may be readily implemented by those skilled in the art. However, it is to be noted that the present inventive concept is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

A method for setting and transmitting a geographical address of a terminal in a packet transmission system in accordance with embodiments of the present inventive concept, may include, in a system sending and receiving data by transmitting packets, automatically setting a destination address, including the address in a packet, and routing the packet in order to transmit the address-included packet to the destination.

However, the address is a geographical address that is location information based and different from the conventional IP addresses, and this geographical address may be automatically set based on the location information and the MAC information of a terminal.

The method for setting and transmitting a geographical address of a terminal in a packet transmission system in accordance with embodiments of the present inventive concept may first set the geographical address based on location information of the terminal and on whether the destination to which the packet is transmitted is a single destination or an area destination. This may be performed by the terminal transmitting a packet including the geographical address.

A single destination means that the destination to which the packet is transmitted is not a specific area range but a specific terminal, while an area destination represents a specific area in which a set of multiple terminals are located.

After setting the geographical address as described above, the terminal may form a packet including the geographical address, and transmits the packet to the destination. The sent packet is transmitted via the network, and can also be transmitted to another network that uses a different address system. Details thereof will be described later.

FIG. 1 is a basic configuration diagram of a geographical address system in accordance with an illustrative embodiment of the present inventive concept.

As depicted in FIG. 1, the geographical address system may have a length of 128 bits and include an address identifier field, a location information field, a range field, and an ID field.

The address identifier field is a field indicating that the address is a geographical information-based address. That is, the address identifier field stores an address identification code for showing that the address is different from a conventional IPv4 or IPv6 address.

It is virtually impossible to radically transform current networks into networks adopting the geographical address system. It can be done by following the example of transforming the conventional IPv4 networks into IPv6 networks, which shows that, with various transition mechanisms, the IPv4 networks are being gradually transformed into the IPv6 networks through a network transition stage in which the IPv4 networks and the IPv6 networks coexist.

Therefore, the geographical address system in accordance with embodiments of the present inventive concept may have 128 bits that is equal to the basic length of an IPv6 address so as to be applied to the IPv6 address system which is the next generation of IP address system.

With consideration for translation into and from the IPv6 address system, upper 8 bits of the address identifier field may identify whether or not the address is a geographical address. If the geographical address system is not universally used throughout different networks but only used in some particular networks, the geographical address may be translated into an IPv6 address (or an IPv4 address) in order to be provided with services in those networks that don't support the geographical address system.

During communication between heterogeneous networks having different address systems, the address identifier field can be used to determine whether or not there is a need to perform an address translation like the example of the IPv4/IPv6 translation mechanisms (ex: NAT-PT).

The location information field is a field that includes location information of the terminal.

The location information field may include latitude, longitude, and altitude as the location information of the terminal acquired by means of a GPS or the like. The latitude and longitude information is expressed using degrees, minutes, and seconds. The seconds may be rounded to the second decimal place.

As depicted in FIG. 1, the location information may be expressed with 8 bits. Latitude is divided into north and south, and represented in degrees, minutes, and seconds. Degrees are in a range from 0 to 90. Minutes vary in a range from 0 to 60. Seconds are in a range from 0 to 60, having two digits before the decimal point and two digits after the decimal point.

Longitude is divided into east and west, and represented in degrees, minutes, and seconds. Degrees are in a range from 0 to 180. Minutes are in a range from 0 to 60. Seconds are in a range from 0 to 60, and may have two digits before the decimal point and two digits after the decimal point. Altitude may be expressed with a height value followed by a unit. The height values vary in a range from 0 to 999, and the unit may be either m or km. The expression for the altitude information can be adjusted to be suitable for the applications using the geographical address system.

The location information may be acquired by the terminal by using a positioning system, such as a GPS, equipped in the terminal. If the terminal does not have any positioning system available or the positioning system cannot operate, the location information may be acquired from a reference point.

That is, since it is difficult for the terminal to acquire its location information by itself if the terminal is not equipped with a GPS receiver or the terminal is indoors, a method for setting a geographical address for a terminal that cannot acquire its own location information is needed.

Figure 2:
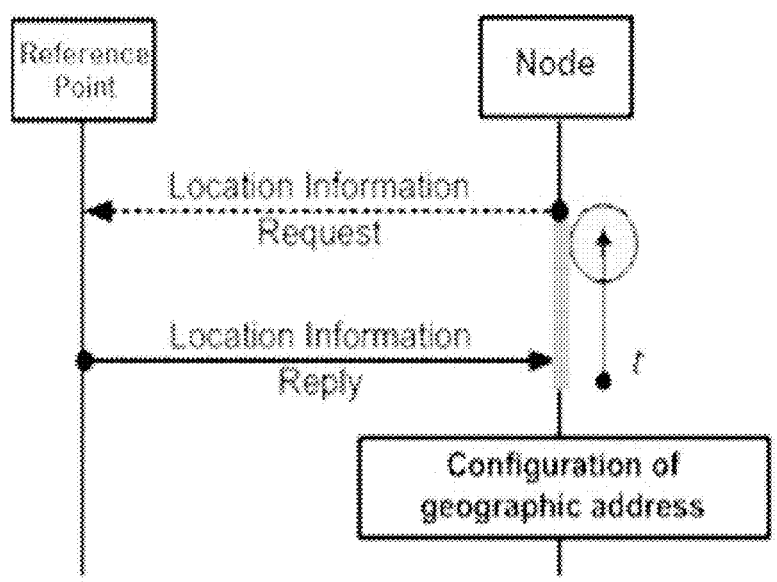
FIG. 2 shows a sequence of setting an address by means of acquiring location information when a location information measurement means is not available for a terminal in accordance with an illustrative embodiment of the present inventive concept.

FIG. 2 shows a sequence of setting an address by means of acquiring location information from a reference point when location information of a terminal cannot be acquired by itself since there is no positioning system available thereto for setting the address or the positioning cannot operate.

Referring to FIG. 2, a terminal that cannot acquire its location information may transmit a location information request message to a reference point (for example, an access point), acquire the location information by receiving a location information reply message including location information of the reference point, and then set the geographical address by using the location information and its MAC address with others.

The location information may be acquired, when the terminal is in a multi-hop network environment. In this case, the location information can be acquired by means of a location information reply message received by the terminal from its neighboring nodes in response to the terminal's transmitting a location information request message to within one-hop range. If the location information reply message is not received within a certain time, it may be acquired by transmitting another location information request message with an extended transmission range of two or more hops.

Figure 3:
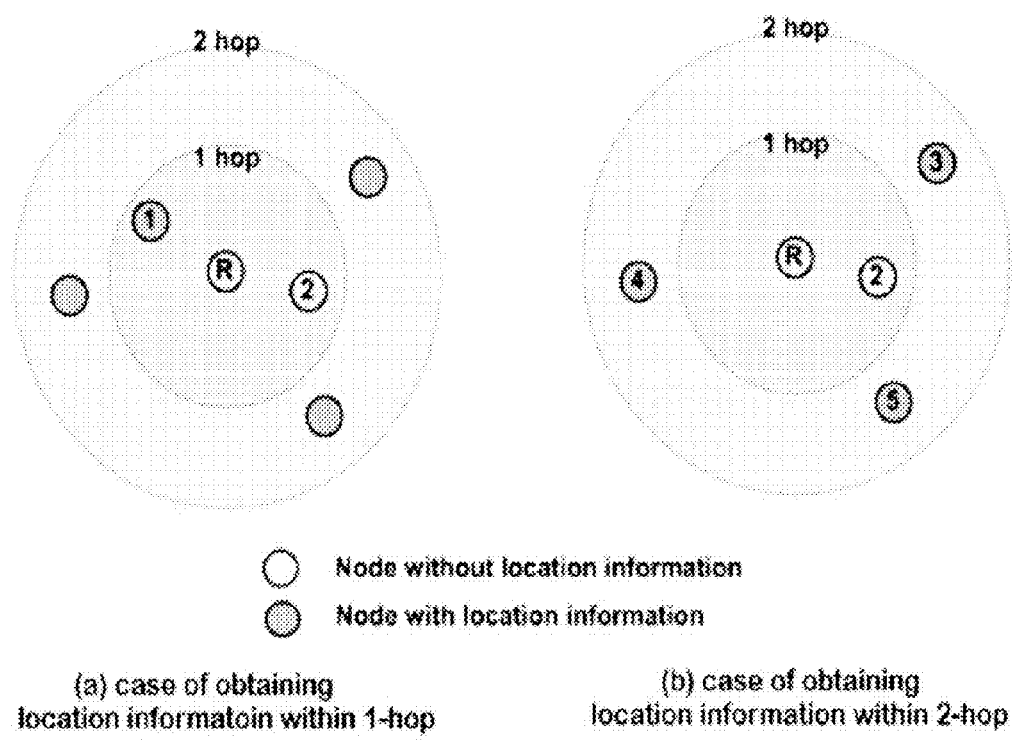
FIG. 3 explains the concept of setting an address by means of acquiring location information when a location information measurement means is not available for a terminal in a wireless multi-hop network environment in accordance with an illustrative embodiment of the present inventive concept.
Figure 4:
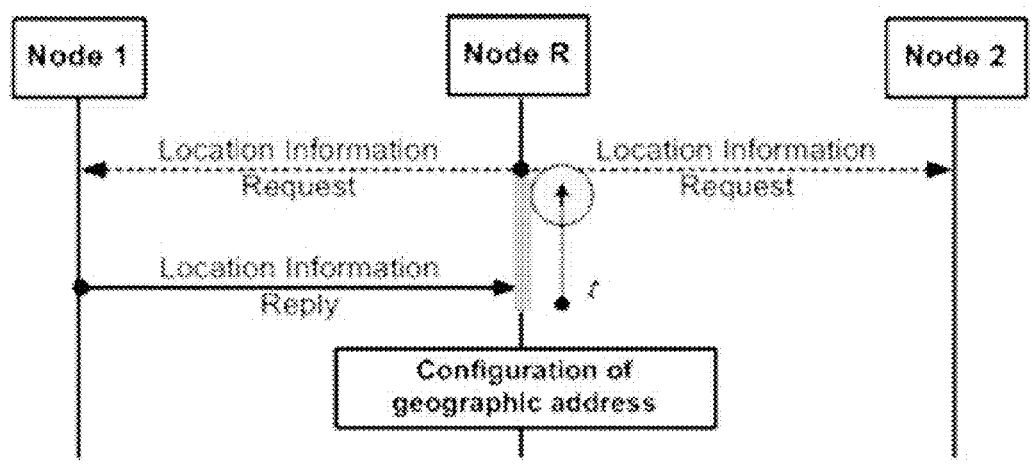
FIG. 4 shows a sequence of setting an address within one hop, in a wireless multi-hop network environment in accordance with an illustrative embodiment of the present inventive concept.
Figure 5:
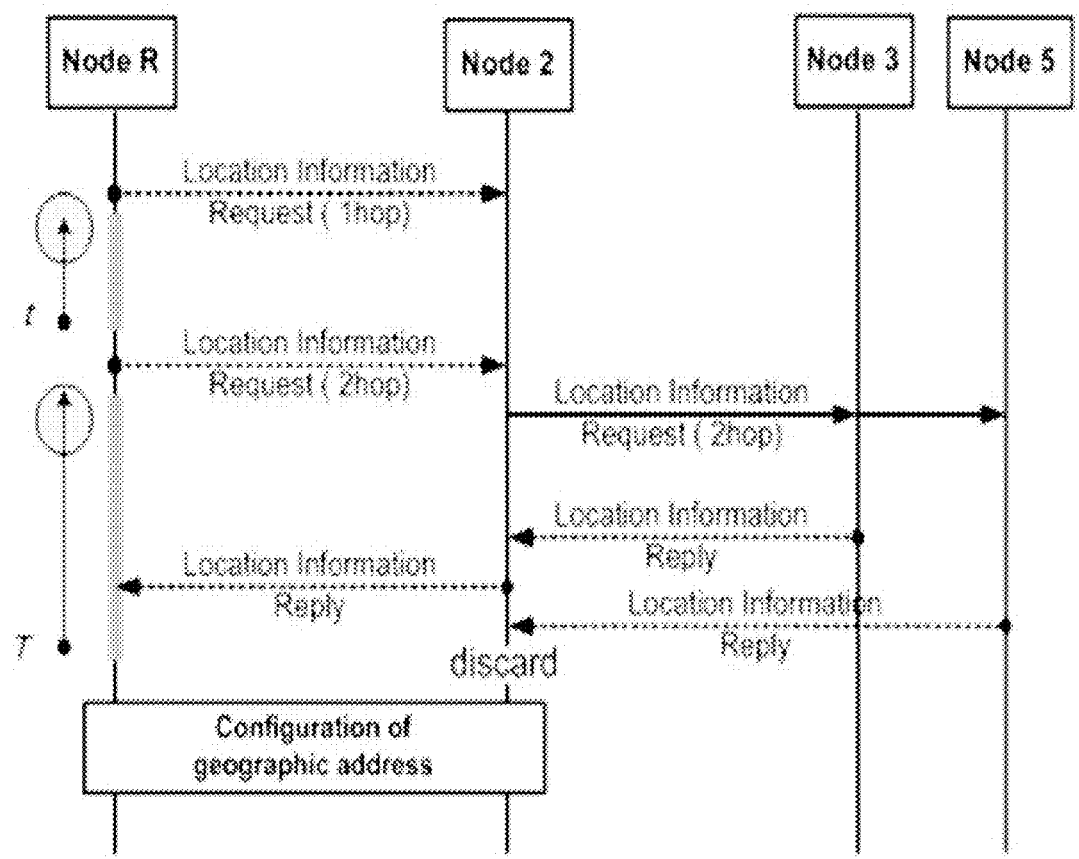
FIG. 5 shows a sequence of setting an address within two hops, in a wireless multi-hop network environment in accordance with an illustrative embodiment of the present inventive concept.

FIG. 3 shows examples in which the terminal acquires location information from within a range of one hop and two hops, respectively. FIGS. 4 and 5 show sequences of the terminal setting its geographical address by acquiring the location information from within a range of one hop and two hops, respectively.

As depicted in FIG. 3 (left side) and FIG. 4, the terminal in the multi-hop network environment may transmit a location information request message to within one-hop range, and, using the location information reply message received from its neighboring nodes, set the geographical address.

If the location information reply message is not received before a certain time limit expires after the transmission of the location information request message, the terminal may transmit another location information request message with an extended transmission range of two or more hops, in consideration of the case that the neighboring nodes in one-hop range of the terminal may not have location information either.

As depicted in FIG. 3 (right side) and FIG. 5, since there is no terminal that has location information within one hop range, the terminal may extend the transmission range to two hops, and set the geographical address using the location information received from its neighboring nodes within two hops.

The range field may indicate whether the destination is a single destination or an area destination, and include the range information of the area destination in the case of an area destination. Having no value in the range field may indicate that the destination is a single destination, while a specific value therein may indicate that the destination is an area destination.

If the range field represents an area destination, the range of the area destination may be expressed based on the location information in the location information field. The area destination can be expressed in the form of a three-dimensional circle, a hexahedron, or a polygon.

The range field may be applied to the geographical address of the terminal's communication partner. If the communication partner is a single terminal (i.e. a single destination), there is no information expressed in the range field (i.e. there is no specific value included in the field). On the other hand, if the communication partner is not a single terminal, i.e. if a packet is transmitted to terminals in a specific area (geocast area), the range field may include the area (range) information for geocasting to transmit a packet to the specific area.

By way of example, if upper 2 bits of the range field have a value of 0, it may mean that the geographical address does not include a specific area (range) (i.e. it means a single destination). In this case, since the range field represents a single destination, the ID field does not need to express detailed area range information of the area destination, and therefore, a MAC address of the terminal may be stored in there.

If the upper 2 bits of the range field have a value of 1, it may mean that the geographical address represents the specific area (range) in the form of a circle. In this case, the range field may describe the specific area range by representing the radius of a circle from the center point stored in the location information field. The radius have values in a range from 0 to about 999 (10 bits), and m or km can be used for the unit.

Figure 6:
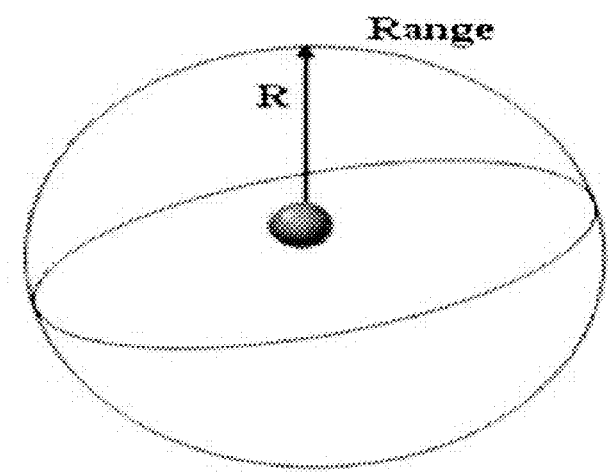
FIG. 6 shows an example of expressing the range of a destination area in the form of a three-dimensional circle by using a range field in accordance with an illustrative embodiment of the present inventive concept.

The expression for the circle range can be adjusted to be suitable for the applications using the geographical address system. FIG. 6 shows an example where the specific area of the geographical address is expressed in the form of a circle.

If the upper 2 bits of the range field have a value of 2, it may mean that the geographical address represents the specific area (range) in the form of a rectangular parallelepiped. The range can be expressed in various ways depending on how and from what reference the point stored in the location information field is expressed.

Figure 7:
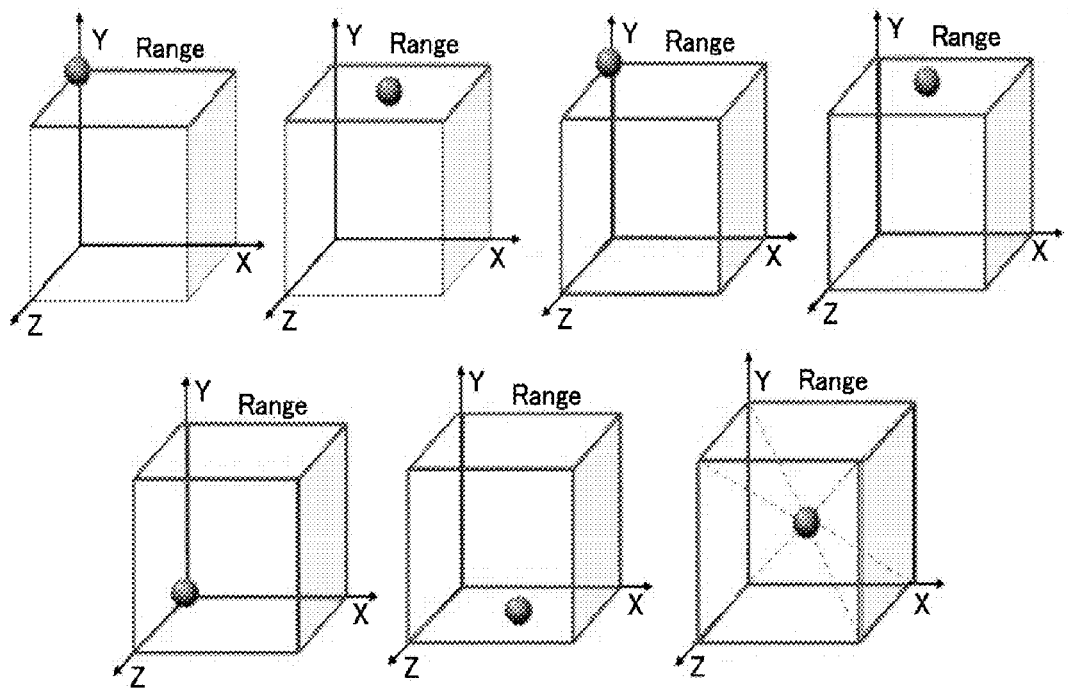
FIG. 7 shows an example of expressing the range of a destination area in the form of a hexahedron by using a range field in accordance with an illustrative embodiment of the present inventive concept.

For example, FIG. 7 shows that there can be various expressions depending on how the specific area (marked with bold lines) may be expressed with respect to the reference point (expressed as a ball). Information for expressing the specific area range is described in the ID field that represents detailed information of the area destination. If the ID field doesn't have enough space to represent the information, an IPv6 extension header can be used.

That is, the range of the area destination may be expressed in detail in the ID field. If not, it can be expressed by using IPv6 extension headers. Details thereof will be described below.

The ID field may include either the MAC address of the terminal or detailed information of the area range expressed in the range field. To be specific, if the destination is a single destination, the ID field may represent the MAC address of the terminal, and if the destination is an area destination, the ID field may represent detailed information of the area range expressed in the range field.

If the ID field is for the address of a single terminal (i.e. a single destination), the MAC (Media Access Control) address assigned to a network interface card of the terminal may be included in the ID field. The ID field including the MAC address may be used to distinguish terminals by their unique addresses even when there are some errors in information acquired from the positioning system (GPS or similar mechanisms) of the terminal.

Figure 8:
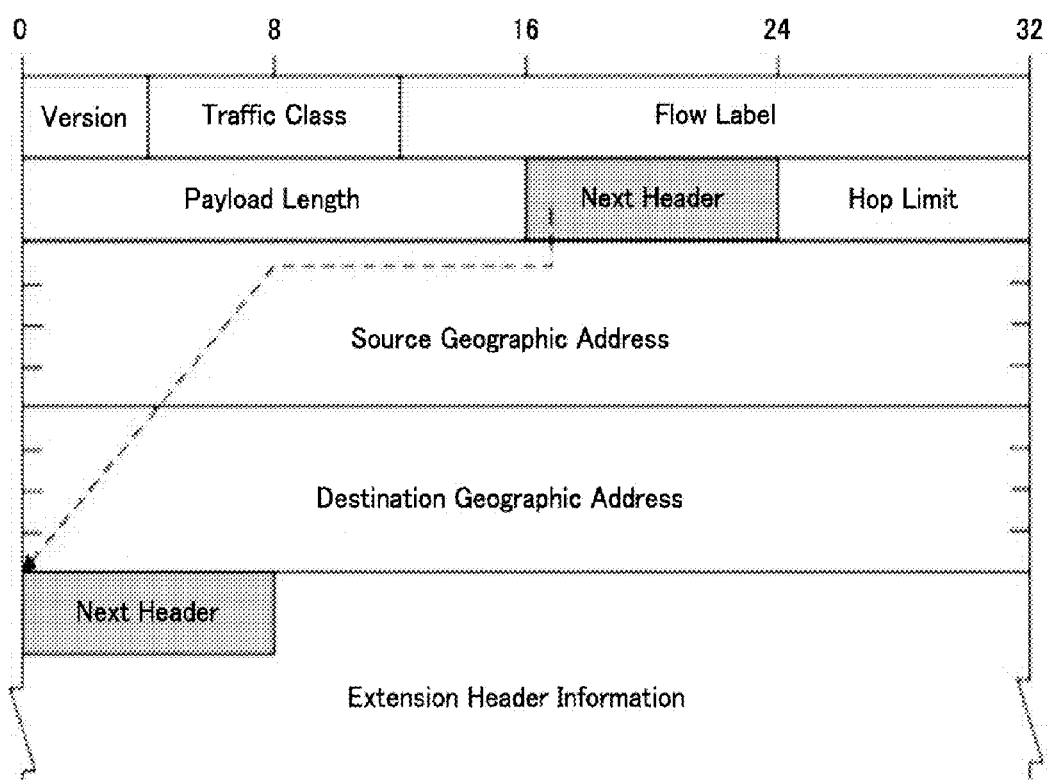
FIG. 8 is an explanatory diagram of an IPv6 header representing a geographical address system in accordance with an illustrative embodiment of the present inventive concept.

On the other hand, if the address is for a specific area (i.e. an area destination), the ID field may include detailed information of the specific area (range) which couldn't be expressed in the range field due to the limited space of the range field. The specific area can be expressed in the form of a circle, a rectangular parallelepiped, or a polygon. If 48 bits of the ID field are not enough to express the specific area, one or more IPv6 extension headers may be used as depicted in FIG. 8.

IPv6 extension headers describe IPv6 header options and newly added functions to the IPv6 address system. For example, functions for communication are attached to the basic IPv6 header as a set of extension headers.

A packet may include a basic IPv6 header, and one or more extension headers in accordance with each communication need can be attached to the basic header. This configuration is used to increase the routing efficiency. Examples of IPv6 extension headers that have been defined so far include hop-by-hop options, routing, fragment, authentication, ESP (Encapsulating security payload), and destination options.

Details of the extension headers are as follows:

Table 1 below shows extension headers in the early days. All extension headers (except No. 59) have their own next header field. This configuration allows an IP address to attach multiple extension headers to it. The last extension header uses its next header field to point to a higher-level protocol.

TABLE 1

| IP Extension Header | |
| --- | --- |
| 0 | Hop-by-Hop Options Header |
| 43 | Routing Header |
| 44 | Fragment Header |
| 51 | Authentication Header |
| 59 | No Next Header |
| 60 | Destination Options Header |

Figure 9:
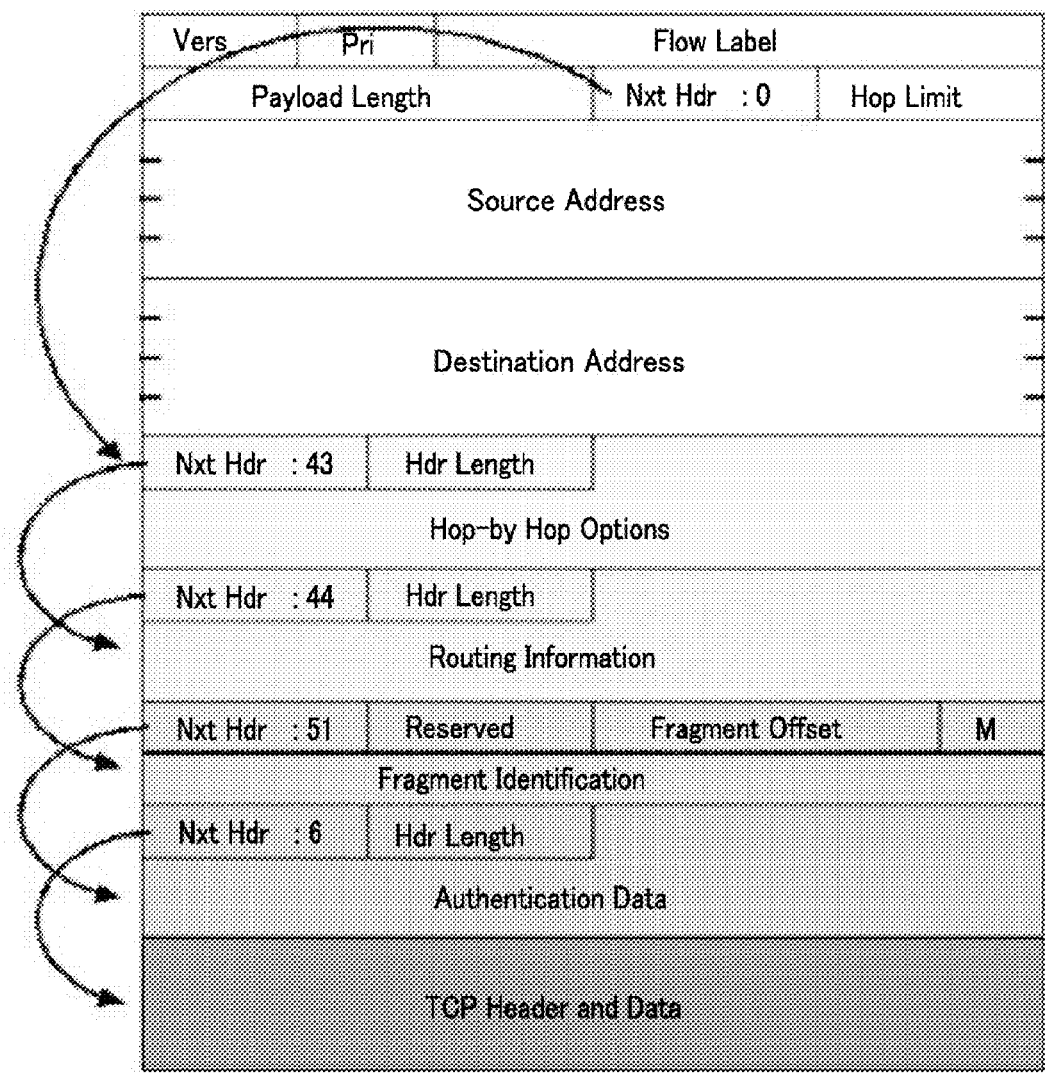
FIG. 9 shows a datagram including extension headers in accordance with an illustrative embodiment of the present inventive concept.

FIG. 9 shows a datagram including some extension headers. As depicted in FIG. 9, each header may designate its next header until the sequence reaches the authentication header whose next header field designates a higher-level protocol (TCP in this case).

Since the extension headers are not fixed in size, various types of IPv6 extension headers can be additionally developed. Therefore, if a basic geographical address (128 bits) doesn't have enough space to represent the area range information, an IPv6 extension header can be used to describe detailed information.

Meanwhile, a terminal that received a packet including the geographical address in accordance with the above-described method of setting a geographical address, may compare the location information, range, and ID field of the geographical address in the packet, and determine whether or not to receive the packet based on a result of the comparison.

For example, if the terminal that received the packet including the geographical address finds that the range field of the geographical address included in the received packet indicates a single destination, the terminal may receive the packet only when its MAC address is in agreement with the information included in the ID field.

If the terminal that received the packet including the geographical address finds that the range field of the geographical address included in the received packet indicates an area destination, the terminal may receive the packet only when the terminal is located in the range of the area destination defined by the range field and the ID field.

If no specific area is specified in the range field of the geographical address of the received packet, the packet's destination is a single node. Thus, the terminal may determine whether or not to receive the packet depending on whether or not the MAC address of the terminal is in agreement with the ID field of the address.

On the other hand, if a specific area is specified in the range field of the geographical address of the received packet, the terminal may determine whether or not to receive the packet by checking whether the location of the terminal is in the range of the specific area defined by the location information field and the range field.

The terminal which can automatically set its geographical address as described above may include a module for setting an address by acquiring the location information and the MAC address, a module for setting a relative address by designating a specific area as the address of the destination in a special case that a packet needs to be transmitted to the specific area, and a module for determining whether or not to receive a packet.

To be more specific, the terminal may include a location information receiving unit to acquire the location information of the terminal from a GPS or a similar mechanism equipped in the terminal. And if the terminal cannot acquire its location information by itself, the terminal may acquire the location information by sending a request message to a reference point asking for the location information of its surroundings and receiving a replay message from the reference point.

In accordance with embodiments of the present inventive concept, location information of the terminal can be acquired by parsing a data structure as shown in FIG. 1. The location information of the terminal may include, for example, latitude, longitude, and altitude.

The terminal in accordance with embodiments of the present inventive concept may include a MAC address acquiring unit. The MAC address acquiring unit may acquire the MAC (Media Access Control) address information assigned to the network interface card of the terminal.

The terminal in accordance with embodiments of the present inventive concept may include a location range designating unit. If the terminal transmitting a packet wants the destination of the packet to include a specific area, the location range designating unit may calculate the range of the specific area based on the information acquired by the location information receiving unit and add the calculated range to the range information field of the data structure shown in FIG. 1. However, if the address of the terminal represents a single terminal that does not include a specific area, there may be nothing to be processed by the location range designating unit.

The terminal in accordance with embodiments of the present inventive concept may include a geographical address setting unit. The geographical address setting unit may set an address in accordance with the geographical address system shown in FIG. 1 based on the information acquired by the location information receiving unit, the MAC address acquiring unit, and the location range designating unit.

The terminal in accordance with embodiments of the present inventive concept may include a packet acceptance determining unit. The packet acceptance determining unit may determine whether or not to receive a packet based on the destination address of the received packet. If the destination address of the packet includes a specific area, the packet acceptance determining unit may determine whether or not to accept the packet based on whether or not the terminal that received the packet is included in the specific area as a destination expressed in the location information field, the range field, and the ID field of the destination address.

If the destination address represents a single terminal instead of a specific area, the packet acceptance determining unit may determine whether or not to receive the packet based on whether or not the MAC address of the terminal is in agreement with the ID field information of the destination address.

The terminal in accordance with embodiments of the present inventive concept may include a relative location range designating unit and a relative address setting unit for the case that the destination of communication is a specific area instead of a single terminal. The packet acceptance determining unit in accordance with embodiments of the present inventive concept, based on the information in the address identifier field of FIG. 1, may determine whether to proceed to an IP address information processing process or to a geographical address information processing process, and forward the received packet to the chosen process.

If the destination of the packet needs to be specified as terminals in a certain area, the relative location range designating unit may get the location range designating unit to specify the range of the destination area, and, based on this information, the relative address setting unit may set the destination address.

The above-described method of setting a geographical address has advantages including that an address can be automatically set based on the location information and the MAC address of a terminal. Although the IPv6 address system provides automatically setting of an address, it needs a router advertisement message containing a network prefix that should be received from a router, that is, an external terminal.

On the contrary, in accordance with embodiments of the present inventive concept, addresses can be automatically set without any help of routers or other external nodes, and, thus, it can be easier to establish a network. However, since the geographical address system in accordance with embodiments of the present inventive concept is expected to be employed in limited networks first, for supporting interconnectivity between a geographical address based network and an external network, a gateway that provides connectivity between the two networks may have functions as follows.

If a packet including the geographical address is transmitted to a network using the conventional IP address system, a gateway that connects networks using the geographical address system with networks using the conventional IP address system, may transmit the packet including the geographical address to the network using the conventional IP address system by performing an address translation.

After translating the geographical address into the conventional IP address, the gateway may store into a table the address before and after the translation of the terminal that transmitted the packet including the geographical address, and use the information stored in the table when determining the transmission destination of a packet received from the network using the conventional IP address.

The gateway that connects the network using the conventional IP address system with the network using the geographical address system may include a device configured to perform an address translation when a packet is transmitted to an external network so that communications between the two different networks can be carried out smoothly.

The gateway that forwards a packet transmitted by a terminal within a network using the geographical address system to an external network may translate the geographical address of the terminal into a global IP address suitable for the external network, and may store into a table the address before and after translation of the terminal transmitting the packet. Then, the gateway can use the information stored in this table to translate the destination address of a packet received from the communication partner terminal in the external network to forward the packet to the destination terminal in the geographical network.

The address translation of an address of an internal terminal into a global IP address performed by the gateway including the device for translating addresses can be applied to both the IPv4 address system and the IPv6 address system depending on the IP address system version of the external network connected to the gateway. If the counterpart terminal is a terminal using the IPv4 address system, the header of the packet may be translated to an IPv4 packet.

Figure 10:
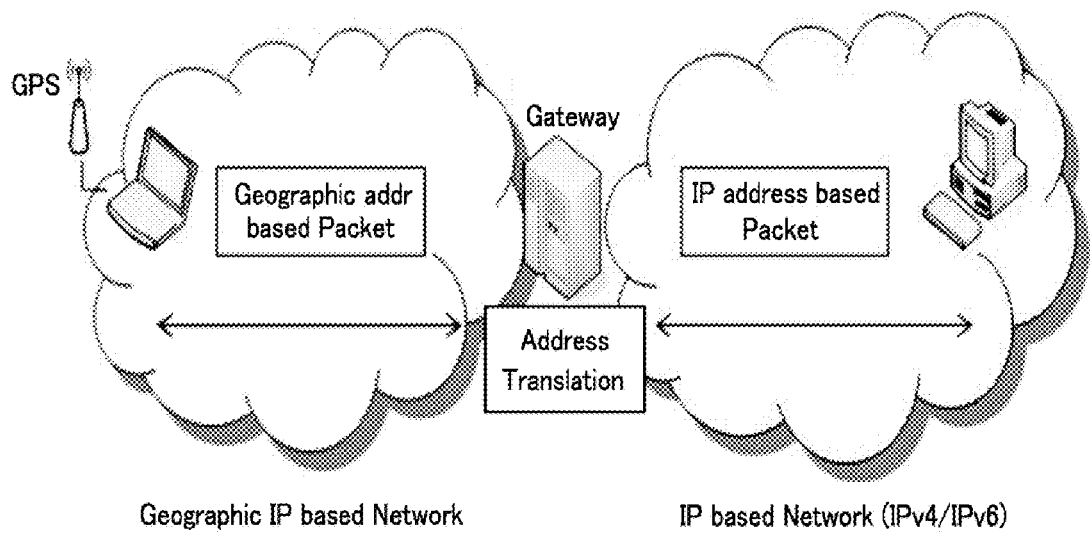
FIG. 10 shows an example of interworking between an external network and a geographical address-based network in accordance with an illustrative embodiment of the present inventive concept.

Therefore, as depicted in FIG. 10, the geographical address system in accordance with embodiments of the present inventive concept can be more useful when the geographical address-based network can interwork with external networks.

Meanwhile, in accordance with an illustrative embodiment of the present inventive concept, for network addressing, an address system including a node identifier/identification (NID) and a flexible address can be used.

The flexible address may include a flexible local address (FLA) and a flexible global address (FGA). The flexible local address may be mainly used in a local network, and the flexible global address may be mainly used in a backbone network or global networks. That is to say, Flexible Global Address (FGA) is an address of node within backbone network, while Flexible Local Address (FLA) is an address of node within local network. Flexible Address (FA) is either FGA or FLA. Node ID (NID) is a globally unique identification. FLA-FGA Router (LGR) is a router that exists between local network and backbone network. FLA Router (FR) is a router that exists between LGR and node within local network. Backbone Router (BR) is a router that exists between LGRs within backbone network. NID-FA System (NFS) is database system that includes NID and FA. Inbound traffic is traffic from a backbone network to a local network. Outbound traffic is traffic from a local network to a backbone network. A FLA Node is a device that uses FLA. Also, A flexible address may include a locator that represents location-based information. The locator may include an absolute locator which may include area range information based on latitude, longitude, altitude, and an area range from an absolute location of the location of the node, and a relative locator which may include at least one of a distance of the node from a reference point and an area range of the node from the reference point. Either an absolute locator or a relative locator can be included depending on the flexible address. In other words, Locator (LOC) represents geographical location of a node in the network. It can be either Absolute LOC or Relative LOC. LOC may be represented by global location (Global LOC) or by local location (Local LOC). Global LOC can be either Absolute LOC or Relative LOC, while Local LOC can be relative LOC. LOC also may include 'node id', 'node flag' indicating whether the node is fixed or mobile, 'bandwidth information', 'processor information', etc. Those information may be used in routing. Absolute LOC may be represented by latitude, longitude, altitude, and its range from the physically absolute position information. Relative LOC may be represented by relative distance and range from reference point. Distance information is to represent relative location from the reference point. Range information is to represent an area with reference point as a center.

Figure 11:
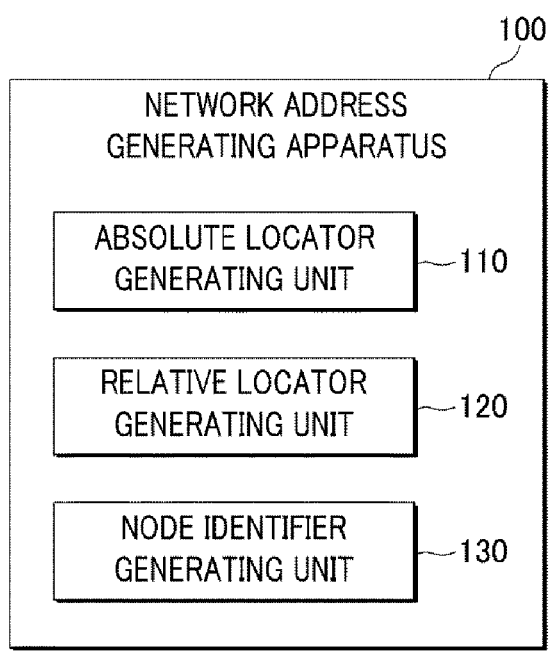
FIG. 11 shows a network address generating apparatus in accordance with an illustrative embodiment of the present inventive concept.

FIG. 11 shows a network address generating apparatus in accordance with an illustrative embodiment of the present inventive concept.

In accordance with an illustrative embodiment of the present inventive concept, a network address generating apparatus 100 may include an absolute locator generating unit 110 that generates an absolute locator and a relative locator generating unit 120 that generate a relative locator, and generates the node's network address including either the absolute locator or the relative locator.

The absolute locator generating unit 110 may generate an absolute locator that includes at least one of latitude, longitude, altitude, and an area range from an absolute location of the location of the node.

The relative locator generating unit 120 may generate a relative locator that includes at least one of a distance of the node from a reference point and an area range of the node from the reference point.

The network address generating apparatus 100 may further include a node identifier generating unit 130. The node identifier (NID) is a unique number for identifying a user node and may be specified by a unique serial number of the hardware of the node, information of a processor included in the node, or information of a bandwidth.

Figure 12:
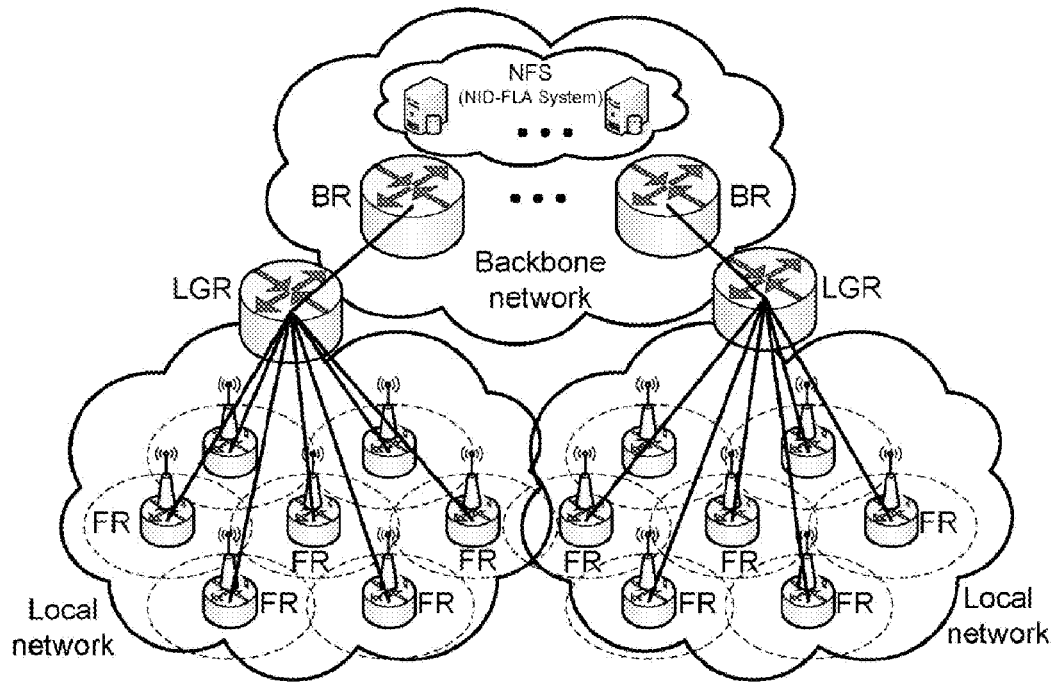
FIG. 12 is an explanatory diagram of a network system using a new address system in accordance with an illustrative embodiment of the present inventive concept.

FIG. 12 is an explanatory diagram of a network system using a new address system in accordance with an illustrative embodiment of the present inventive concept.

The illustrated communication network system in FIG. 12 is divided into local networks and a backbone network. The local networks may include multiple routers (FR) that perform routing based on the flexible local address system. The local networks may be connected to the backbone network via local global routers (LGR).

The backbone network may include multiple routers (BR) that perform routing based on the flexible global address system.

A lower level of the router FR may be connected to one or more FLA nodes. The FLA node can generate a flexible local address based on the information provided by the local global router. The FLA node may include one or more node identifiers. Communications between the FLA nodes can be performed based on the node identifiers. The FLA node can serve as a FLA router (FR) in a multi-hop environment such as a MANET (mobile ad hoc network).

Next, the local global router may perform inter-translation between the flexible local address and the flexible global address. The local global router may include one or more interfaces to the local network side and one or more interfaces to the backbone network side.

For transmission of data for outbound traffic, the local global router may translate a flexible local address into a flexible global address. For the source address of the flexible global address, the local global router uses its own flexible global address. And for the destination address, the local global router uses a search result based on the node identifier NID of the destination node.

For transmission of data for inbound traffic, the local global router may translate a flexible global address into a flexible local address. For the source address of the flexible local address, the local global router may use its own flexible local address. And for the destination address, the local global router may use a search result based on the node identifier NID of the destination node.

For communications between FLA nodes, the local global router may hold a mapping table containing the relationship between the NIDs and the flexible local addresses of the local network nodes. The local global router also may maintain a mapping table storing the relationship between the NIDs and the flexible global addresses of the backbone network nodes.

Further, the illustrated NFS (NID-FA system) may store and manage the node identifiers and the flexible global addresses or the node identifiers and the flexible local addresses information. The NFS may serve as a central network management unit and manage operations of the nodes, the local global routers and others.

The flexible local address used in this network system may be the address of a local node (referred to as a "FLA node" herein) that is in the local network, and may be included for each interface of the local network node.

The flexible local address of the FLA node may be used as information for routing in the local network. It may be used as information for generating a virtual circuit. Meanwhile, a network prefix may use a hierarchical locator structure.

The flexible local address may include fields as described below:

The flexible local address may include an addressing type field that indicates which addressing structure is used, a flag that indicates whether the location of the node is fixed or mobile, a flag that indicates whether the address is only for the local network or it is also available for the backbone network, the bandwidth of the interface connected to the node, the performance of the CPU of the node, a flag that indicates whether a virtual circuit is supported, usage range of the virtual circuit, information of the labels used in the virtual circuit, a service type, other information of the node, ID information distinguishable from other nodes, and a LOC field that represents location information of the node. In short, an address might be made up with fields including Addressing type which represents what addressing is used, Mobile/Fixed node flag that represents whether the interface connecting with node is mobile or fixed, backbone/local flag that represents whether address can be used in only local network or in backbone network, Bandwidth Information of interface that is connected with node, Processor Information of node, Virtual Circuit flag that represents whether Virtual Circuit is supported, Virtual Circuit region, e.g., information about a range of using Virtual Circuit, Virtual Circuit label that is used in Virtual Circuit, Service type, ID that is distinguished with other nodes, Node Information, e.g., other distinguishing information of node, and LOC, e.g., location information of node.

Meanwhile, the flexible global address used in the above network system may be the address system used in the backbone network and may be used as the address of a local global router.

The flexible global address may be configured to be uniquely used in the global network either manually or automatically, and may be used as information for routing in the backbone network. It may be used as information for generating a virtual circuit. Meanwhile, a network prefix may use a hierarchical locator structure.

The flexible global address may include fields as described below:

The flexible global address may include an addressing type field that indicates which addressing structure is used, a flag that indicates whether the location of the node is fixed or mobile, a flag that indicates whether the address is only for the local network or it is also available for the backbone network, the bandwidth of the interface connected to the node, the performance of the CPU of the node, a flag that indicates whether a virtual circuit is supported, usage range of the virtual circuit, information of labels used in the virtual circuit, a service type, other information of the node, ID information distinguishable from other nodes, and a LOC field that represents location information of the node. An address might be made up with fields including Addressing type which represents what addressing is used, Mobile/Fixed node flag that represents whether the interface connecting with node is mobile or fixed, backbone/local flag that represents whether address can be used in only local network or in backbone network, Bandwidth Information of interface that is connected with node, Processor Information of node, Virtual Circuit flag that represents whether Virtual Circuit is supported, Virtual Circuit region, e.g., information about a range of using Virtual Circuit, Virtual Circuit label that is used in Virtual Circuit, Service type, ID that is distinguished with other nodes, Node Information, e.g., other distinguishing information of node, and LOC, e.g., location information of node.

The LOC field can be specified by the above-described locator.

Figure 13:
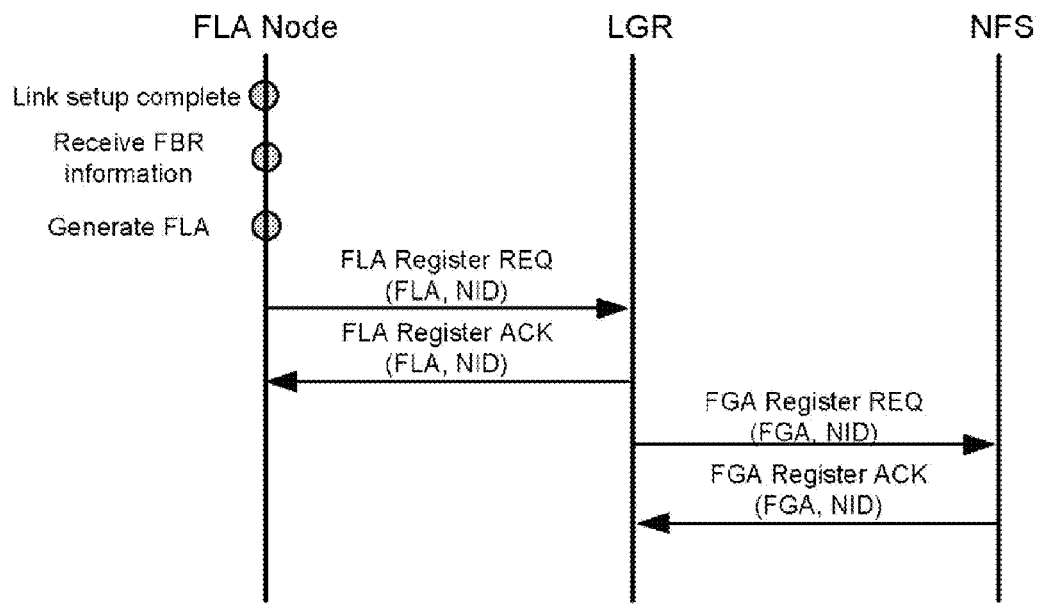
FIG. 13 shows a sequence of registering a locator of a FLA node in a network system in accordance with an illustrative embodiment of the present inventive concept.

FIG. 13 shows a sequence of registering a locator of a FLA node in a network system in accordance with an illustrative embodiment of the present inventive concept.

First, the FLA node may set up the interface link. After the setup is completed, the FLA node may receive information of the local global router.

Then, the FLA node may generate the flexible local address based on information of its own locator and the information of the local global router.

Thereafter, the FLA node may make a request for registration of the flexible local address to the local global router. This request may include the flexible local address and the node identifier.

Subsequently, in response to the request, the local global router may transmit an acknowledgement message indicating that the registration of the flexible local address is done.

Then, the local global router may make a request for registration of the flexible global address to the NFS. This request may include the node identifier information of the FLA node and the flexible global address of the local global router.

Subsequently, in response to the request, the NFS may transmit an acknowledgement message indicating that the registration of the flexible global address is done. In short, a LOC registration can be performed as follows: FLA node may perform interface link setup. After finishing link setup, FLA node may receive information of LGR. FLA node may create FLA from its own information and information of LGR. FLA node may send FLA Register REQ to LGR. This FLA Register REQ may include FLA and NID. LGR may send FLA Register ACK to FLA node by replies of FLA Register REQ. This FGA Register REQ may include FGA and NID for LOC registration of FLA node. FGA may be address of LGR. NFS may send FGA Register REQ to LGR by replies of FGA Register REQ.

Figure 14:
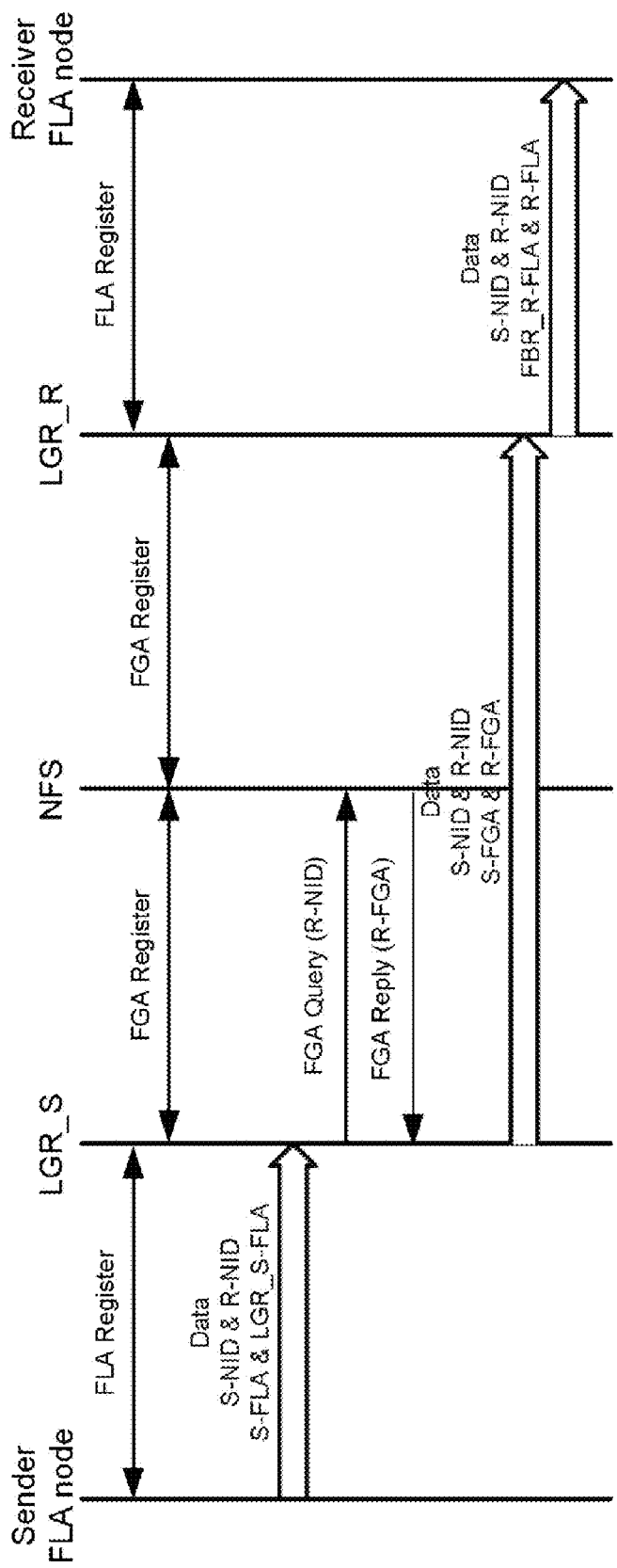
FIG. 14 shows a sequence of querying locator information in a network system in accordance with an illustrative embodiment of the present inventive concept.

FIG. 14 shows a sequence of querying locator information in a network system in accordance with an illustrative embodiment of the present inventive concept.

The sender FLA node and the receiver FLA node may register their flexible local addresses at respective local global routers.

Then, the sender FLA node may transmit a data packet including the NID of the sender, the NID of the receiver, the flexible local address of the sender, and the flexible local address of the local global router to the receiver FLA node. This packet may be transmitted to the local global router LGR_S, and the local global router LGR_S that received the packet may search a previously cached NID-FGA mapping table by using the node identifier of the receiver FLA node. If the result shows that any corresponding flexible global address is not in the mapping table, the local global router LGR_S may make a query to the NFS for the flexible global address including the node identifier of the receiver FLA node. In response to the query, the NFS may search the node identifier of the receiver FLA node and the flexible global address corresponding thereto, and return the results to the local global router LGR_S.

The local global router LGR_S may match the flexible global address received from the NFS with the node identifier of the receiver FLA node, and update the NID-FGA mapping table.

The local global router LGR_S may translate the flexible local address into the flexible global address, and transmit the data packet, which is transmitted to the local global router LGR_R. The transmitted data packet may include the NID of the sender, the NID of the receiver, the flexible global address of the sender local global router, and the flexible global address of the receiver local global router.

Then, the local global router LGR_R that received the data packet may forward the data packet to the receiver FLA node, the data packet including the NID of the sender, the NID of the receiver, the flexible local address of the receiver local global router, and the flexible global address of the receiver. To sum up, NID-FLA mapping table is used to manage FLA information of FLA node in the local network. The NID-FLA mapping table may contain information of mapping between NIDs and FLAB. LGR may maintain NID-FLA mapping table about FLA nodes in local network. FLA node may have NID-FLA mapping table about FLA nodes of the same local network. And, the NID-FGA mapping table may be used to manage FGA information of FLA nodes in the backbone network. The NID-FGA mapping table may contain information of mapping between NIDs and FGAs. LGR may cache NID FGA mapping table about correspond node which FLA node communicates with in local network. NFS may maintain NID-FGA mapping table according to GLMP of LGR. NFS may have NID-FGA mapping table of all FLA node.

Meanwhile, the network system in accordance with an illustrative embodiment of the present inventive concept may provide a routing method for a mobile FLA node.

Figure 15:
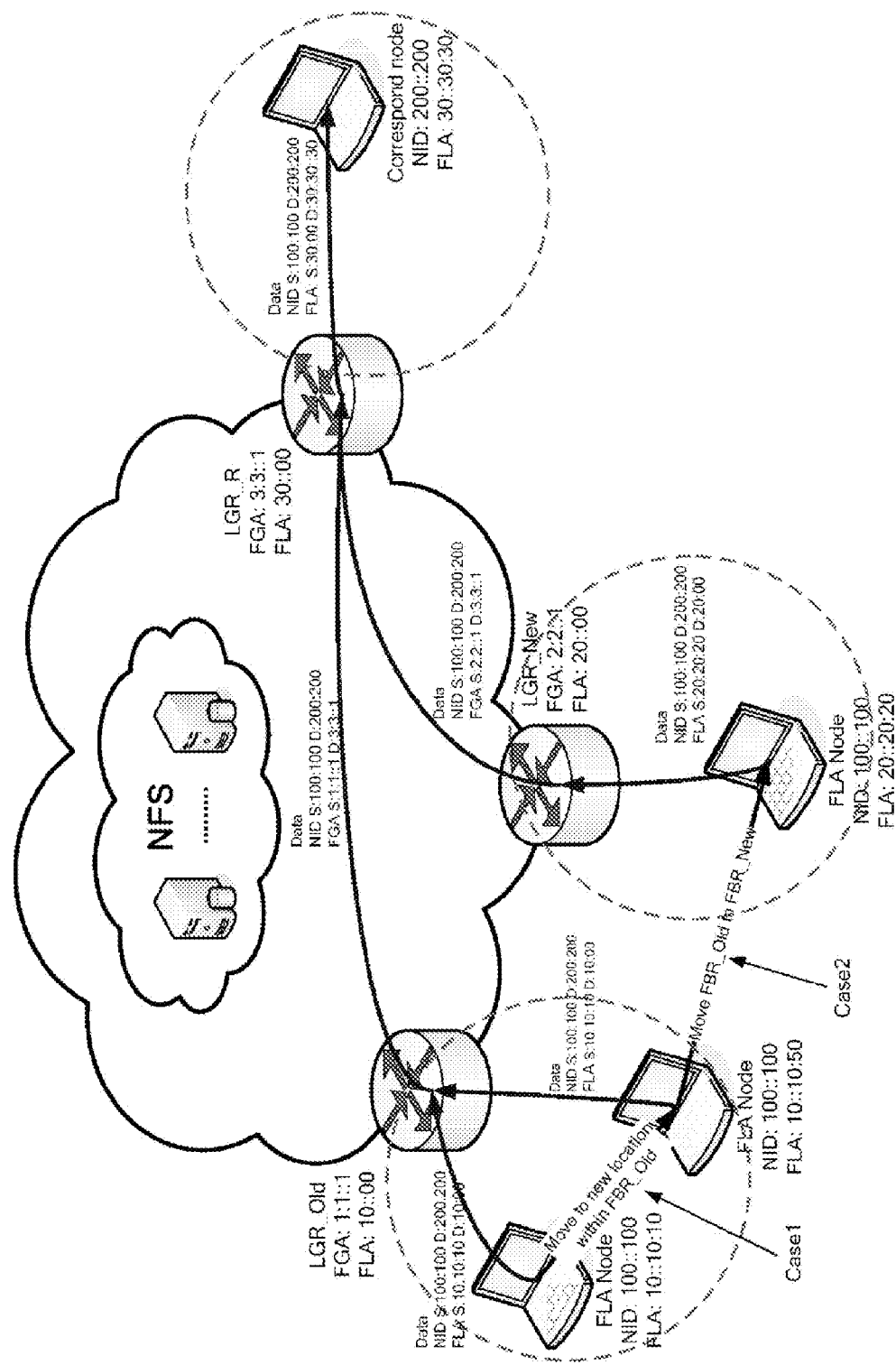
FIG. 15 explains the concept of a routing method when a FLA node changes its location in a network system in accordance with an illustrative embodiment of the present inventive concept.
Figure 16:
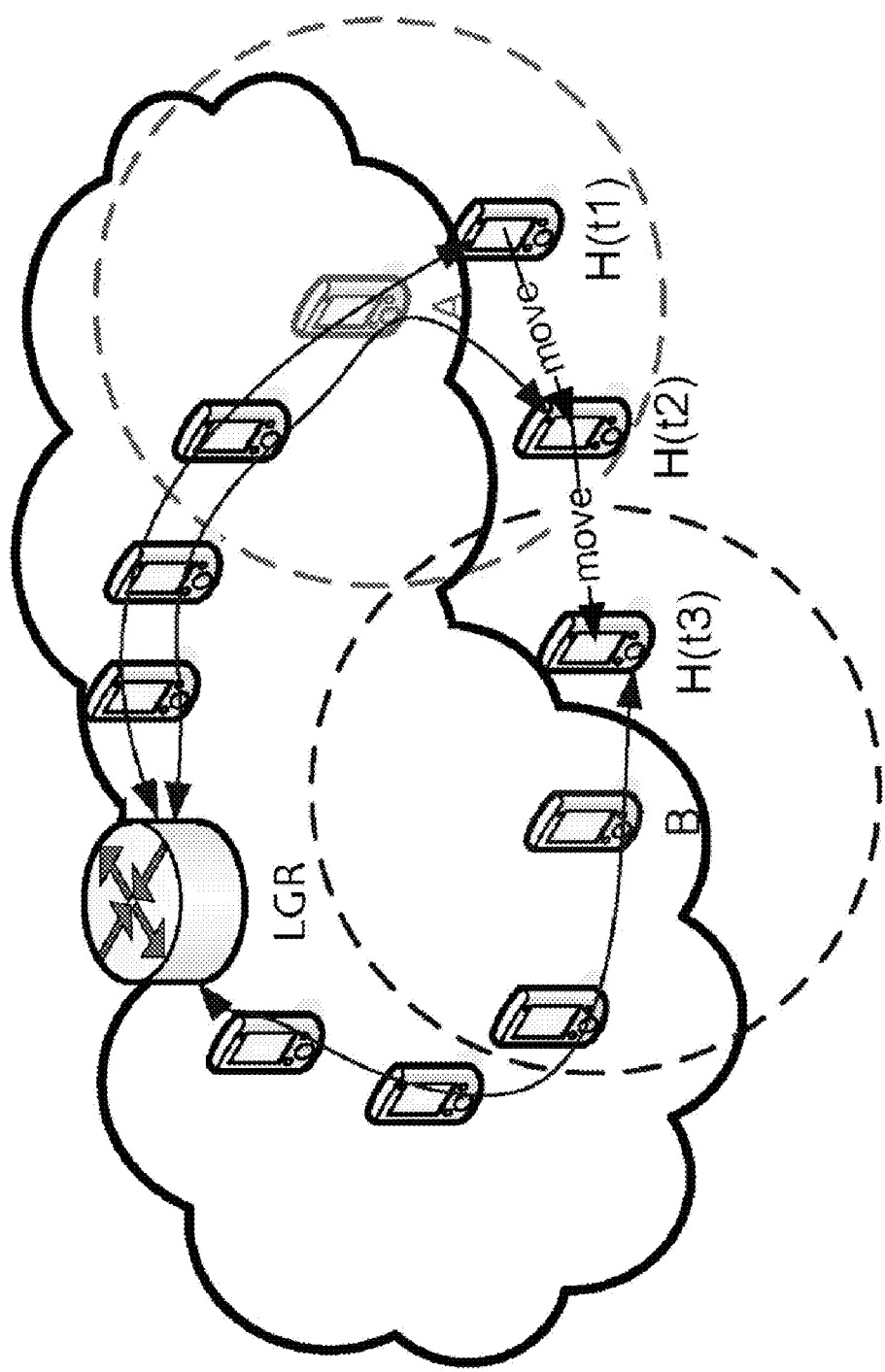
FIG. 16 explains the concept of a routing method when a FLA node changes its location in a network system in accordance with an illustrative embodiment of the present inventive concept.
Figure 17:
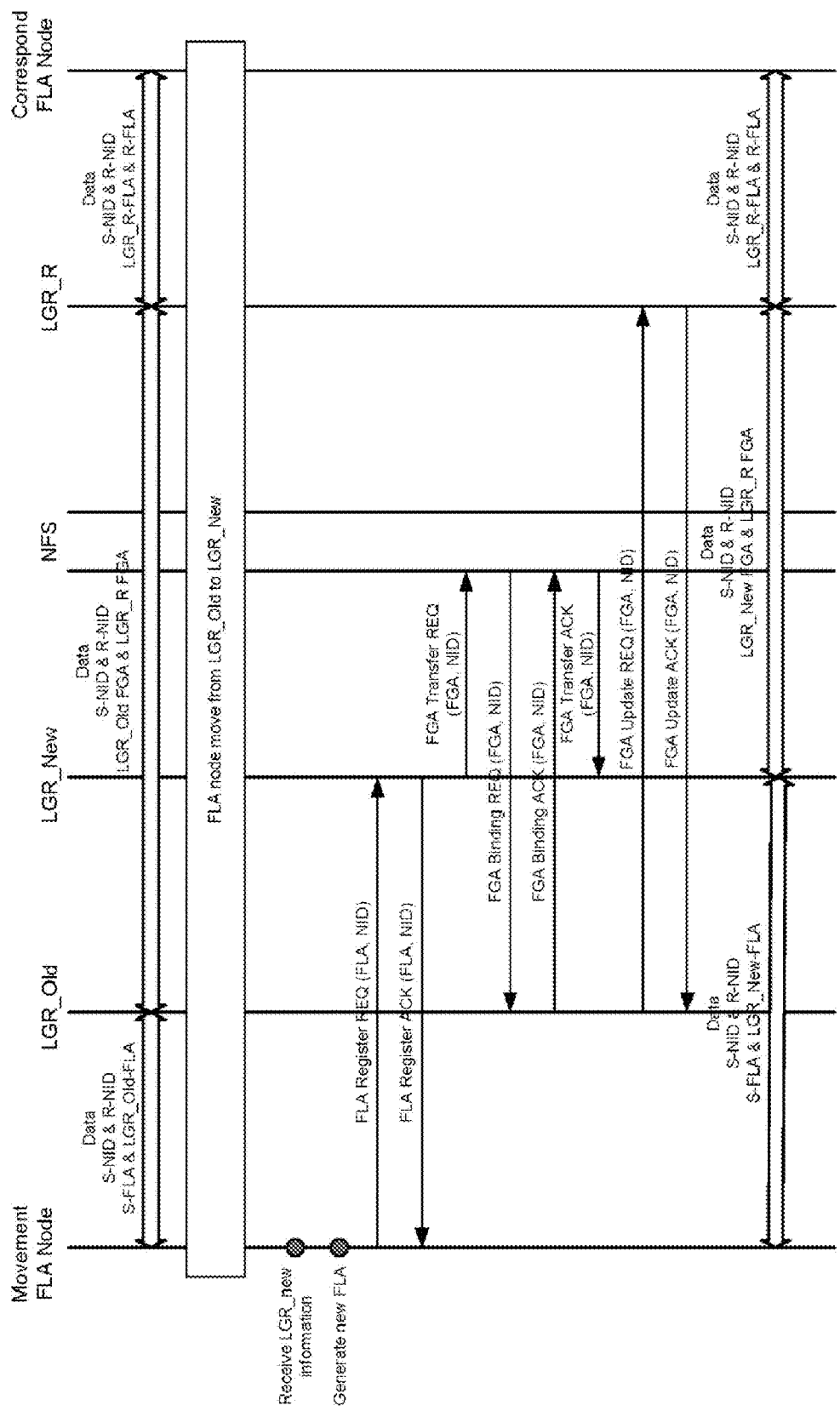
FIG. 17 shows a sequence of changing routers when a node changes its location in a network system in accordance with an illustrative embodiment of the present inventive concept.

FIGS. 15 to 17 show routing methods when a FLA node changes its location in a network system in accordance with an illustrative embodiment of the present inventive concept.

The change of the location of a FLA node can be classified into two cases: The first case is that the FLA node moves around within the same local global router range. In this case, since the position of the FLA node is changed, a new locator is generated and the flexible local address is changed accordingly. However, since the FLA node is in the same local global router service range, the flexible global address is not changed.

FIG. 16 explains the concept of a routing method when a FLA node changes its location in a network system in accordance with an illustrative embodiment of the present inventive concept.

By way of example, for a more detailed explanation, as depicted in FIG. 15, it is assumed that the network is a multi-hop network such as a MANET, and that at a first time point t1, a FLA node H communicates with the local global router through another FLA node A. At a second time point t2, the FLA node H is moved and, accordingly, the FLA node H generates the flexible local address with a new locator. In this case, since the FLA node H is within a certain distance from the FLA node A, the FLA node H still can communicate through the FLA node A, and therefore, the FLA node H can decide not to notify the new flexible local address to the local global router.

Then, at a third time point t3, the FLA node H moves to a new position, and generates the flexible local address with a new locator accordingly. In this case, since the FLA node H is out of a certain distance from the FLA node A, the FLA node H can start communicating with the local global router through a new FLA node B. To do this, the FLA node H transmits the new flexible local address to the local global router.

The second case is that the FLA node moves into a different local global router's service range. In this case, not only the flexible local address but also the flexible global address should be changed.

FIG. 17 shows a sequence of switching to a new router when a node changes its location in a network system in accordance with an illustrative embodiment of the present inventive concept.

The FLA node may change its location and move into the service range of a new router LGR_New while communicating with its communication partner FLA node via an old router LGR_Old. Accordingly, after setting up the interface link, the FLA node may receive information of the new router LGR_New. Then, the FLA node may generate the new flexible local address with the locator for the new location and information of the new router LGR_New.

Then, the FLA node may register the new flexible local address to the new router LGR_New. For registering of its locator, the FLA node may transmit the flexible local address and the node identifier (NID). Then, the new router LGR_New may register the new flexible local address of the FLA node.

Subsequently, since the movement of the FLA node caused it to switch to a different local router, this may be notified to the NFS. That is, the new router LGR_New may transmit a request to the NFS for modifying the moved FLA node's flexible global address, the request including the flexible global address and the node identifier of the node. The NFS that received the request may search a NID-FGA mapping table based on the NID of the moved FLA node, and identify the router LGR_Old that was servicing the FLA node before the movement. Then, the NFS may transmit a request to the old router LGR_Old for binding the moved FLA node's flexible global address, the request including the NID and the flexible global address.

The old router LGR_Old may update its NID-FGA mapping table in response to the request, and transmit an acknowledgement message indicating the flexible global address binding is successfully done. The NFS that received this acknowledgement message may transmit to the new router LGR_New an acknowledgement message verifying the flexible global address.

Here, the old router LGR_Old that received the request for binding of the flexible global address may search for a list of FLA nodes that was communicating with the FLA node that moved, and based on the results, transmit a request to the routers LGR_R that service the counterpart FLA nodes for updating the moved FLA node's flexible global address, the request including the NID and the flexible global address.

The router LGR_R that received the request for update of the flexible global address may update its NID-FGA mapping table, and transmit a message indicating that the update is completed to the old router LGR_Old.

Meanwhile, before the flexible global address is updated, the old router LGR_Old may transmit a data packet to the new router LGR_New by means of tunneling.

Now, a routing method in a network system in accordance with an illustrative embodiment of the present inventive concept will be explained.

The router FR servicing FLA nodes and a local network can generate and use a virtual circuit by using flexible local addresses, while the router BR servicing a backbone network can generate and use a virtual circuit by using flexible global addresses. With the virtual circuit, it is possible to guarantee QoS, short delays, and traffic management characteristics.

Flexible global address routing determines routing paths between local global routers. Based on the addressing type of the flexible global address, one of the following routing methods can be used:

Firstly, a LPM (longest prefix match) method may be used for the flexible global address system in accordance with IP routing methods like the conventional Internet. Secondly, a routing method using information of the locator of the flexible global address may be used. Thirdly, a method of configuring a virtual circuit using a virtual circuit labels may be used.

Flexible global address routing may determine routing paths between local global routers, between a backbone router BR and a local global router, or between backbone routers.

When generating a virtual circuit, the local global router may use flexible global address information and route information. The flexible global address information may include the mobile/fixed node flag, bandwidth information, CPU information, and node information of the flexible global address. The route information may include the number of hops in the route, the bandwidth, the link state, the delay status, and the load status of the route.

A virtual circuit may use more than one flexible global addresses together. Also, a single flexible global address may be used for multiple virtual circuits. What kind of virtual circuit will be used can be determined by the services, traffic, and delays.

To sum up, FGA routing may decide the route among LGRs. According to addressing type of FGA, FGA routing could be chosen out of routing methods such as the longest prefix matching of FGA same as IP routing of existing internet, routing using hierarchical LOC information of FGA, and generating virtual circuit using virtual circuit label. FGA routing may decide the route including between LGRs, between BR and LGR, between BRs LGR can use FGA information and path information when generating virtual circuit. Information may include FGA information, mobile/fixed node flag of FGA, bandwidth information of FGA, processor information of FGA, node information of FGA, path information, hop count of path, bandwidth of path, link-state of path, and load of path virtual circuit can be used with more than one FLA at once. One FGA can be used through various virtual circuits. At this time, it may be decided which virtual circuit will be used through service, traffic, delay and so on.

Meanwhile, Flexible local address routing may determine routing paths between a local global router and a FLA node. Based on the addressing type of the flexible local address, one of the following routing methods can be used:

Firstly, a LPM (longest prefix match) method may be used for the flexible local address system in accordance with IP routing methods like the conventional Internet. Secondly, a routing method using information of the locator of the flexible local address may be used. Thirdly, a method of configuring a virtual circuit using a virtual circuit labels may be used.

Flexible local address routing may determine routing paths between local global routers, between a local global router and a FLA node, between FLA node routers FRs, between a FLA node router FR and a FLA node, and between FLA nodes.

When generating a virtual circuit, the local global router, the FLA node router, and the FLA node can use flexible local address information, route information, and node status information. The flexible local address information may include the mobile/fixed node flag, bandwidth information, CPU information, and node information of the flexible global address. The route information may include the number of hops in the route, the bandwidth, the link state, the delay status, and the load status of the route. The node status information may include the signal intensity of the interface, the distance from a neighboring node, and battery status information.

A virtual circuit may use more than one flexible local addresses together. Also, a single flexible local address may be used via multiple virtual circuits. What kind of virtual circuit will be used can be determined by the services, traffic, and delays.

To sum up, FLA routing may decide the route between LGR and FLA node. According to addressing type of FLA, FLA routing could be chosen out of routing methods such as the longest prefix matching of FLA same as IP routing of existing internet, routing using hierarchical LOC information of FLA, and generating virtual circuit using virtual circuit label. FGA routing may decide the route including between LGR and FR, between LGR and FLA node, between FRs, between FR and FLA node, between FLA nodes. LGR, FR, FLA node can use FGA information, path information and node status when creating virtual circuit. Information may include FLA information, mobile/fixed node flag of FLA, bandwidth Information of FLA, processor information of FLA, node information of FLA, Path information, hop count of path, bandwidth of path, link-state of path, delay of path, load of path, node status, interface signal strength, distance of neighbor, and battery status. Virtual circuit can be used with more than one FLA at once. One FLA can be used through various virtual circuits. At this time, it may be decided which virtual circuit will be used through service, traffic, delay and so on.

The illustrative embodiments can be embodied in a storage medium including instruction codes executable by a computer or processor such as a program module executed by the computer or processor. A data structure in accordance with the illustrative embodiments can be stored in the storage medium executable by the computer or processor. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanisms, and includes information transmission mediums.

The above description of the present inventive concept is provided for the purpose of illustration, and it would be understood by those skilled in the art that various changes and modifications may be made without changing technical conception and essential features of the present inventive concept. Thus, it is clear that the above-described embodiments are illustrative in all aspects and do not limit the present inventive concept. For example, each component described to be of a single type can be implemented in a distributed manner. Likewise, components described to be distributed can be implemented in a combined manner.

The scope of the present inventive concept is defined by the following claims rather than by the detailed description of the embodiment. It shall be understood that all modifications and embodiments conceived from the meaning and scope of the claims and their equivalents are included in the scope of the present inventive concept.

What is claimed is:

1. A packet processing method in a network comprising a plurality of terminals, the method comprising:
    transmitting, from a first terminal, a location information request message to at least one reference point terminal;
    receiving location information of the reference point terminal;
    generating location information of the first terminal based on the location information of the reference point terminal;
    generating, at the first terminal, a packet including a geographical address; and
    transmitting, from the first terminal, the packet to a destination,
    wherein the geographical address includes a location information field having location information of the first terminal, and a range field indicating whether the destination is a single destination representing that the destination is a target terminal or an area destination representing the destination is a target area, and having range information of the target area in the case that the destination is the area destination and
    wherein the transmitting of the location information request message comprises
        transmitting the location information request message to neighboring nodes of the first terminal within one-hop range from the first terminal,
        determining whether a reply message to the location information request message is received within a certain time, and
        transmitting the location information request message to the neighboring nodes of the first terminal within two-hop range from the first terminal.

2. The method of claim 1, wherein the geographical address further includes:
    an address identifier field indicating that the geographical address is generated based on a geographical address system; and an ID field having detailed information of the destination.

3. The method of claim 2, wherein the detailed information of the ID field includes:
    a MAC address of the target terminal in the case that the destination is the single destination.

4. The method of claim 3, further comprising:
    receiving, by a second terminal, the packet transmitted from the first terminal, wherein the second terminal receives the packet when its MAC address is identical to the MAC address of the target terminal included in the ID field.

5. The method of claim 2, wherein the detailed information of the ID field includes:
    detailed information of the range information of the target area defined in the range field in the case that the destination is the area destination.

6. The method of claim 5, wherein the information exceeding a capacity assigned for the ID field is stored to IPv6 extension headers.

7. The method of claim 5, further comprising:
    receiving, by a second terminal, the packet transmitted from the first terminal;
    wherein the second terminal receives the packet when it is located within the range of the area destination defined by the range field and the ID field.

8. The method of claim 1, wherein the location information of the location information field comprises latitude, longitude, and altitude of the location where the first terminal is locating.

9. The method of claim 1, wherein the range field includes the range information of the area generated based on a spherical coordinate system, a hexahedron coordinate system, or a polygon coordinate system in the case that the destination is the area destination.

10. The method of claim 1, wherein the geographical address is 128 bits data in a way to be compatible with the IPv6 address system.

11. The method of claim 1,
    wherein the generating of the location information of the first terminal generates the location information of the first terminal by using a positioning system equipped in the first terminal.

12. The method of claim 1, further comprising:
    translating, by a gateway connected to the network including the first terminal, the address of the packet including the geographical address into an address of an address system excluding the geographical address in case that the packet is transmitted to a terminal outside the network,
    wherein the terminal outside the network processes the packet based on the address system excluding the geographical address.

13. The method of claim 12, further comprising:
    storing the address of the packet including the geographical address and translated address into a table; and
    routing a packet transmitted from the terminal outside the network to the network including the first terminal based on address information of the table.

* * * * *